(12) United States Patent
Ypma et al.

(10) Patent No.: US 11,781,644 B2
(45) Date of Patent: Oct. 10, 2023

(54) SELECTOR ASSEMBLY HAVING AN INTERNAL BALL JOINT AND DETENT MECHANISM

(71) Applicant: GHSP, Inc., Holland, MI (US)

(72) Inventors: Kirk Ypma, Rockford, MI (US); Dapeng Xu, Shanghai (CN); Shavin Zhang, Shanghai (CN); Rorbin Luo, Shanghai (CN)

(73) Assignee: GHSP, Inc., Holland, MI (US)

( * ) Notice: Subject to any disclaimer, the term of this patent is extended or adjusted under 35 U.S.C. 154(b) by 0 days.

(21) Appl. No.: 17/870,935

(22) Filed: Jul. 22, 2022

(65) Prior Publication Data

US 2023/0023298 A1    Jan. 26, 2023

Related U.S. Application Data

(60) Provisional application No. 63/224,980, filed on Jul. 23, 2021.

(51) Int. Cl.
*F16H 59/02* (2006.01)
*F16H 59/10* (2006.01)

(52) U.S. Cl.
CPC ....... *F16H 59/0278* (2013.01); *F16H 59/105* (2013.01); *F16H 2059/0269* (2013.01)

(58) Field of Classification Search
CPC ............... F16H 59/0278; F16H 59/105; F16H 2059/0269
See application file for complete search history.

(56) References Cited

U.S. PATENT DOCUMENTS

| 5,680,797 | A | 10/1997 | Elsasser | |
|---|---|---|---|---|
| 9,476,501 | B2 | 10/2016 | Wang | |
| 9,536,689 | B2 | 1/2017 | Noh et al. | |
| 10,077,836 | B2 | 9/2018 | Tomita et al. | |
| 2009/0217781 | A1* | 9/2009 | Kusayama | F16H 61/36 74/473.15 |
| 2013/0061706 | A1* | 3/2013 | Wang | F16H 61/24 74/473.15 |
| 2013/0340558 | A1* | 12/2013 | Kvarnstrom | F16H 59/02 74/473.33 |
| 2014/0345412 | A1* | 11/2014 | Wang | F16H 59/105 74/473.21 |

(Continued)

FOREIGN PATENT DOCUMENTS

| CN | 204143292 U | 2/2015 |
|---|---|---|
| JP | 2017151805 A | 8/2017 |
| WO | 9419735 | 9/1994 |

*Primary Examiner* — David M Fenstermacher
(74) *Attorney, Agent, or Firm* — Price Heneveld LLP

(57) ABSTRACT

A selector assembly includes a housing having a spherical cavity and a detent cavity that form a continuous selector cavity. A selector slidably operates within the selector cavity and about a center point of the spherical cavity. The selector includes a spheroid member that is contained within the spherical cavity and slidably engages a guide surface that defines the spherical cavity. A first pivot includes a first rotational axis that extends through the center point of the spherical cavity. A second pivot includes a second rotational axis that extends through the center point of the spherical cavity. A detent pin is biased toward a detent surface of the detent cavity and slidably engages the detent surface to define a plurality of selector positions of the selector.

20 Claims, 8 Drawing Sheets

(56) References Cited

U.S. PATENT DOCUMENTS

| | | | |
|---|---|---|---|
| 2015/0068343 A1* | 3/2015 | Tokumo | F16H 61/0213 |
| | | | 74/473.12 |
| 2015/0318128 A1 | 11/2015 | Noh et al. | |
| 2016/0146333 A1* | 5/2016 | Jeon | G05G 5/03 |
| | | | 74/473.12 |
| 2017/0037962 A1* | 2/2017 | Moreno Colom | F16H 61/24 |
| 2018/0094719 A1* | 4/2018 | Hill | F16H 59/105 |
| 2018/0172145 A1* | 6/2018 | Farges | F16H 59/0278 |
| 2018/0180170 A1* | 6/2018 | Kvarnström | F16H 59/105 |
| 2018/0180173 A1* | 6/2018 | Yamazaki | F16H 59/0204 |
| 2019/0128404 A1* | 5/2019 | Morales | F16H 59/105 |
| 2019/0145510 A1* | 5/2019 | Moreno Colom | F16H 59/0204 |
| | | | 74/473.3 |
| 2019/0186626 A1* | 6/2019 | Ono | G05G 1/015 |
| 2022/0042593 A1* | 2/2022 | Grassauer | B60K 20/04 |
| 2022/0307588 A1* | 9/2022 | Johnson | F16H 59/04 |
| 2023/0023298 A1* | 1/2023 | Ypma | F16H 59/0278 |

\* cited by examiner

SELECTOR ASSEMBLY HAVING AN INTERNAL BALL JOINT AND DETENT MECHANISM

CROSS-REFERENCE TO RELATED APPLICATION

This application claims priority to and the benefit under 35 U.S.C. § 119(e) of U.S. Provisional Patent Application No. 63/224,980, filed on Jul. 23, 2021, entitled SELECTOR ASSEMBLY HAVING AN INTERNAL BALL JOINT AND DETENT MECHANISM, the entire disclosure of which is hereby incorporated herein by reference.

FIELD OF THE DEVICE

This device is in the field of selector assemblies, and more specifically, a selector assembly that can be used within a vehicle for modifying at least one electrical or mechanical system of the vehicle, where the selector assembly includes an internal ball joint and detent mechanism that cooperate to define a plurality of selector positions.

BACKGROUND OF THE DEVICE

Vehicles and other mechanical systems include selectors that can be used for modifying one or more parameters of the particular mechanism. These selectors usually include a user interface that can be manually operated by a user for communicating instructions to the mechanical assembly.

SUMMARY OF THE DISCLOSURE

According to a first aspect of the present disclosure, a selector assembly includes a housing having a spherical cavity and a detent cavity that form a continuous selector cavity. A selector slidably operates within the selector cavity and about a center point of the spherical cavity. The selector includes a spheroid member that is contained within the spherical cavity and slidably engages a guide surface that defines the spherical cavity. A first pivot includes a first rotational axis that extends through the center point of the spherical cavity. A second pivot includes a second rotational axis that extends through the center point of the spherical cavity. A detent pin is biased toward a detent surface of the detent cavity and slidably engages the detent surface to define a plurality of selector positions of the selector.

According to another aspect, a selector assembly includes a housing having internal supports that extend to a guide surface that partially defines a spherical cavity. The housing further includes a detent cavity that extends outward from the spherical cavity. A selector slidably operates within the housing about a center point of the spherical cavity. The selector includes a spheroid member that is contained within the spherical cavity and slidably engages the guide surface. A first pivot includes a first rotational axis that extends through the center point of the spherical cavity. A second pivot includes a second rotational axis that extends through the center point of the spherical cavity. A stalk extends from the spheroid member and protrudes from the housing. The selector is rotationally fixed with respect to a longitudinal axis that extends through the stalk and the center point. A detent pin is biased toward a detent surface of the detent cavity and slidably engages the detent surface to define a plurality of selector positions of the selector.

According to another aspect, a selector assembly for a vehicle includes a housing that is disposed within a console. The housing includes a spherical cavity and a detent cavity that form a continuous selector cavity. A selector protrudes from the housing and slidably operates within the selector cavity and about a center point of the spherical cavity. The selector includes a selector body having a spheroid member slidably contained within the spherical cavity. A first pivot includes a first rotational axis that extends through the center point of the spherical cavity. A second pivot includes a second rotational axis that extends through the center point of the spherical cavity and a detent sleeve. A detent pin extends from the detent sleeve and is biased toward a detent surface of the detent cavity and slidably engages the detent surface to define a plurality of selector positions of the selector. The selector body is rotationally fixed with respect to a longitudinal axis that extends through a stalk of the selector.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
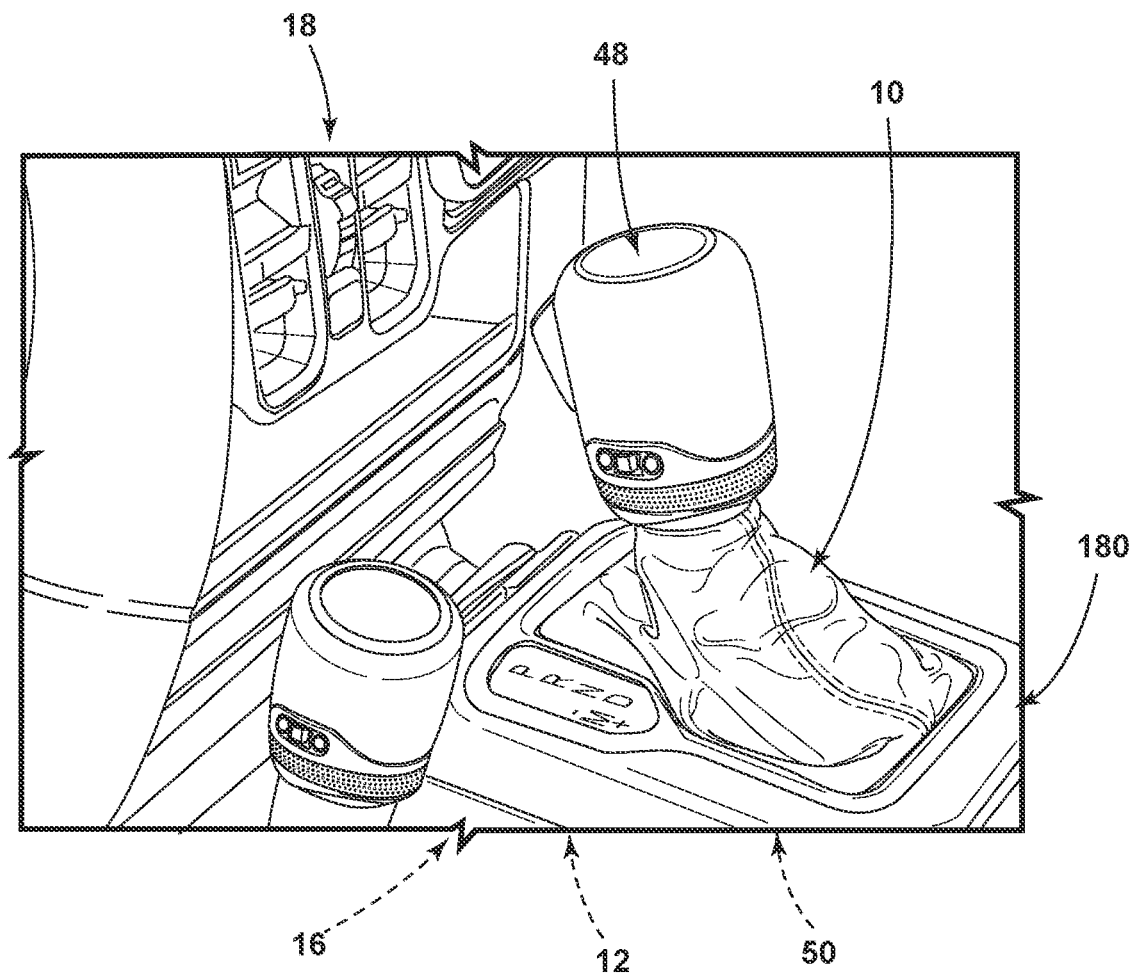
FIG. 1 is a perspective view of a shifter assembly that incorporates an exemplary aspect of the ball-joint selector.
Figure 2:
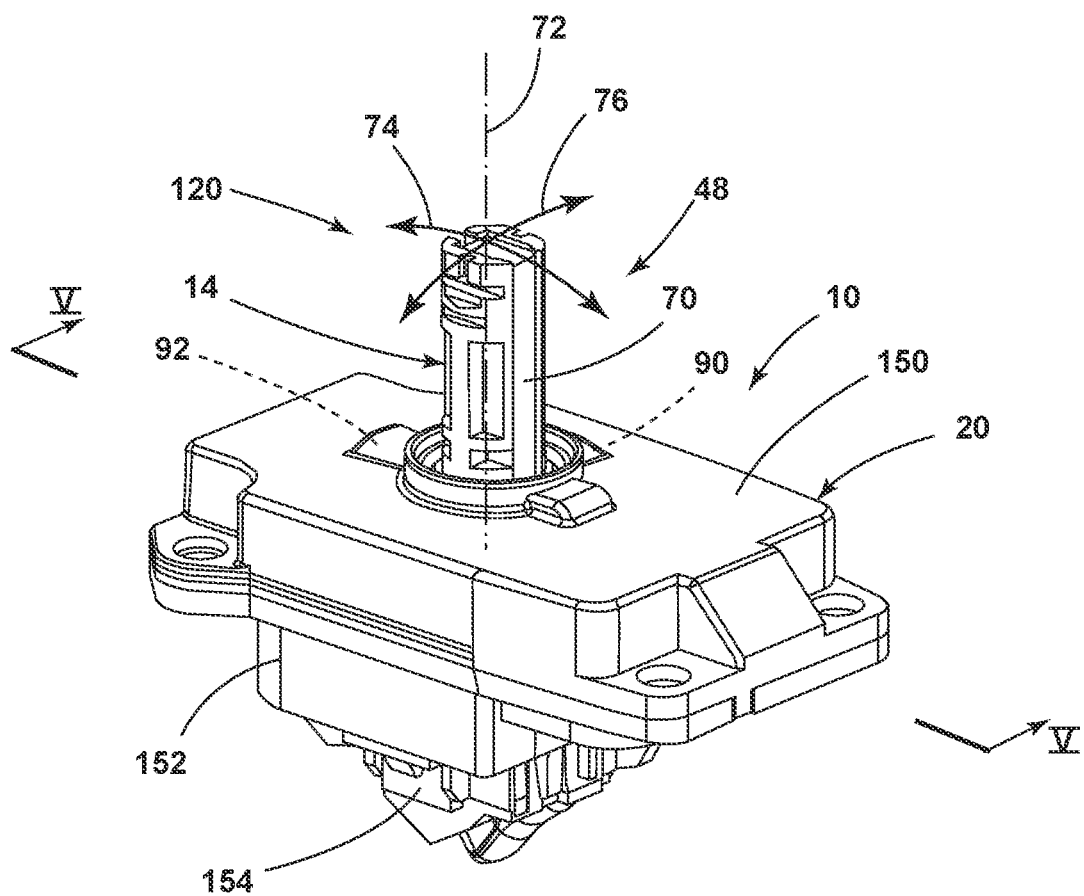
FIG. 2 is a perspective view of the ball-joint selector.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a ball-joint selector assembly that includes a spheroid member that slidably operates within a spherical cavity to contain the movement of the selector through a defined range of selector positions. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-8, reference numeral 10 generally refers to a selector assembly that is incorporated within any one of various dedicated mechanical assemblies 12. The selector assembly 10 includes a ball-joint selector 14 that is used to provide instructions to the mechanical assembly 12, typically via a digital interface. The ball-joint selector 14 can be incorporated within a shift-by-wire mechanism 16 for a vehicle 18 that is used to control a transmission for the vehicle 18. According to various aspects of the device, the selector assembly 10 includes a housing 20 having internal supports 22 that extend into a guide surface 24. The guide surface 24 partially defines a spherical cavity 26. The housing 20 also includes a detent cavity 28 that extends outward from the spherical cavity 26. Through this configuration, the spherical cavity 26 and the detent cavity 28 define a single continuous selector cavity 52 within the housing 20. The ball-joint selector 14 slidably operates within the housing 20 and about a center point 30 of the spherical cavity 26. The ball-joint selector 14 includes a spheroid member 32 that is contained within the spherical cavity 26 and slidably engages the guide surface 24 of the spherical cavity 26.

Referring again to FIGS. 1-8, the ball-joint selector 14 also includes at least one stability feature that provides for selective and alternative rotation of the ball-joint selector 14 about a first rotational axis 38 and a second rotational axis 40. The at least one stability feature also prevents rotation of the ball-joint selector 14 about a longitudinal axis 72 of the ball-joint selector 14. The at least one stability feature can include at least one of a first pivot 34 and a second pivot 36. The first pivot 34 includes a first rotational axis 38 that extends through the center point 30 of the spherical cavity 26. The second pivot 36 includes a second rotational axis 40 that also extends through the center point 30 of the spherical cavity 26. During operation of the ball-joint selector 14, the first and second rotational axes 38, 40 maintain their position through the center point 30 of the spherical cavity 26. Through this configuration, operation of the ball-joint selector 14 within the housing 20 maintains the spheroid member 32 within the spherical cavity 26 of the housing 20. The ball-joint selector 14 also includes a detent pin 42 that is biased toward the detent surface 44 within the detent cavity 28. The detent pin 42 slidably engages the detent surface 44 to define a plurality of selector positions 46 of the ball-joint selector 14. The ball-joint selector 14 and the housing 20 define a user interface 48 that is in communication with a controller 50. Operation of the ball-joint selector 14 within the spherical cavity 26 and along the detent surface 44 defines the plurality of selector positions 46. These selector positions 46 are communicated to the controller 50 for operating the dedicated mechanical assembly 12. This communication of selector positions 46 can be communicated to the user via haptic feedback, visual feedback, auditory feedback, combinations thereof and other forms of feedback.

According to the various aspects of the device, the ball-joint selector 14 includes a stalk 70 that defines the longitudinal axis 72 that extends through the ball-joint selector 14. When the ball-joint selector 14 is disposed within the spherical cavity 26 of the housing 20, it is contemplated that the ball-joint selector 14 is in a rotationally fixed position with respect to the longitudinal axis 72 of the stalk 70. Accordingly, operation of the stalk 70 can be performed by rotating the ball-joint selector 14 about the center point 30 of the spherical cavity 26 in fore-aft directions 74 as well as left-right directions 76. These manipulations of the ball-joint selector 14 occur about the first and second rotational axes 38, 40 of the first and second pivots 34, 36. Accordingly, the movement of the ball-joint selector 14 is typically confined to movements in the fore-aft direction 74 about the first rotational axis 38 and left-right direction 76 about the second rotational axis 40, alternatively. As described herein, the rotationally fixed position of the ball-joint selector 14 with respect to the longitudinal axis 72 of the ball-joint selector 14 can be achieved through the stability feature that can include only one of either the first pivot 34 or the second pivot 36. At the same time, the stability feature allows for selective and alternative rotation of the ball-joint selector 14 about the first rotational axis 38 and the second rotational axis 40.

Referring again to FIGS. 4-8, the housing 20 can include one or both of a first pivot cavity 90 and a second pivot cavity 92 that corresponds to the structure of the stability feature. As discussed herein, the stability feature can include only one or both of the first and second pivots 34, 36.

It is contemplated that the first pivot 34 of the ball-joint selector 14 is defined by a boss that extends into the first pivot cavity 90. The ball-joint selector 14 also includes a second pivot 36 in the form of a separate boss that extends into the second pivot cavity 92. Utilizing at least one of the first and second pivots 34, 36, a rotationally fixed position of the ball-joint selector 14, with respect to the longitudinal axis 72 of the stalk 70, can be maintained within the spherical cavity 26 of the housing 20.

Figure 6:
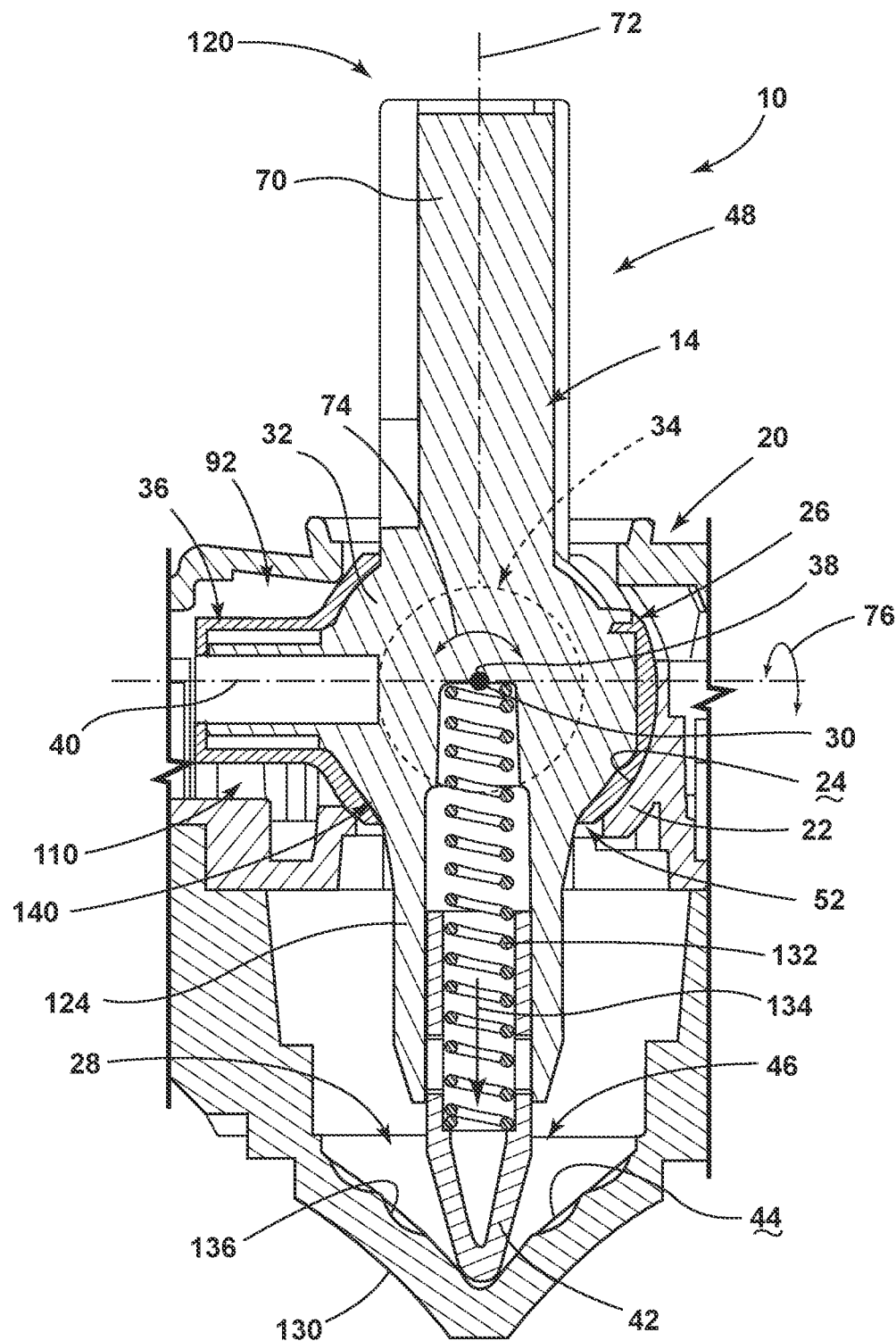
FIG. 6 is an exploded cross-sectional view of the ball-joint selector of FIG. 5 taken at area VI.
Figure 7:
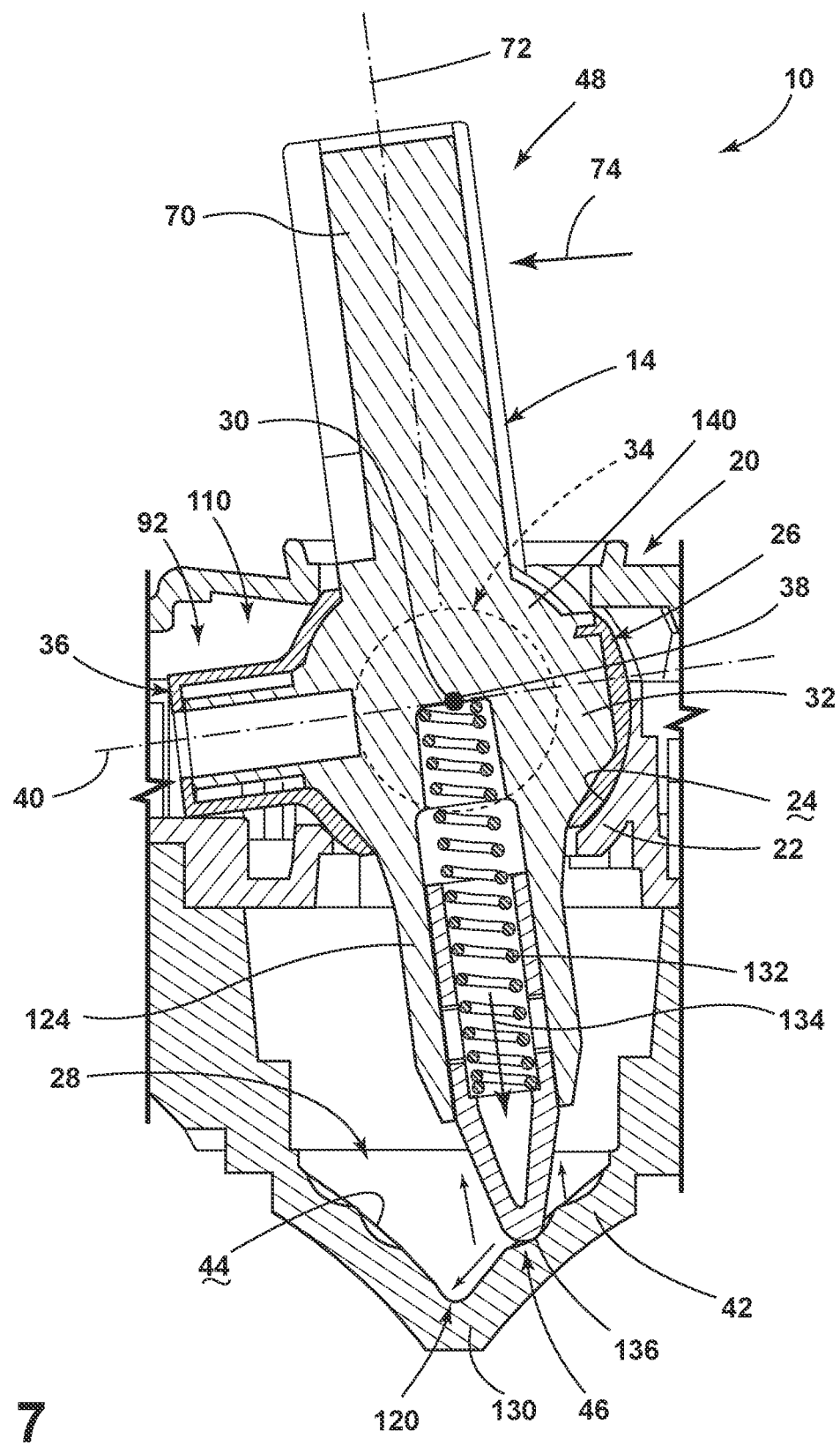
FIG. 7 is a cross-sectional view of the ball-joint selector of FIG. 6 and showing the ball-joint selector in an alternative selector position.
Figure 8:
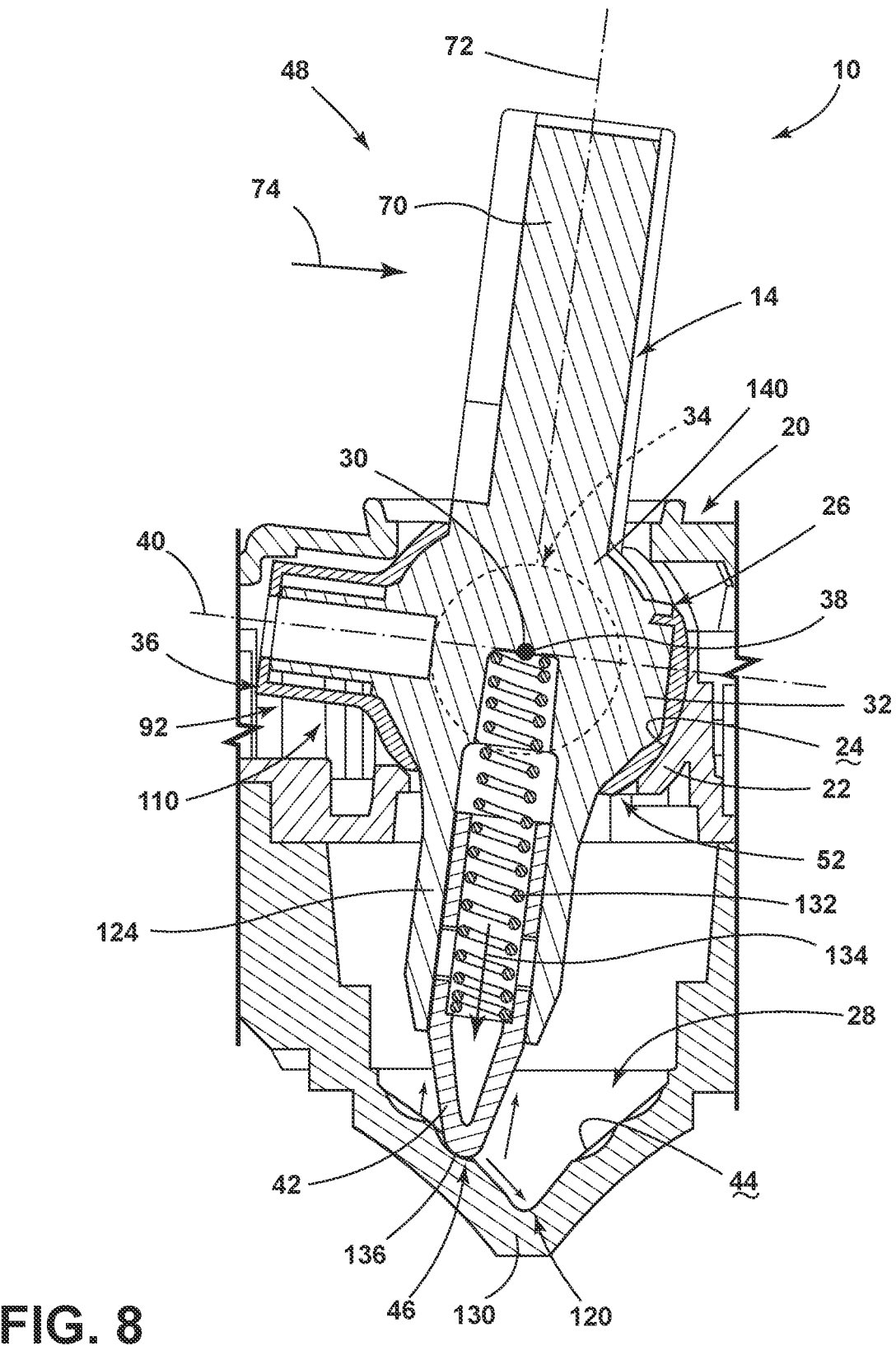
FIG. 8 is a cross-sectional view of the ball-joint selector of FIG. 6 and showing the ball-joint selector in an alternative selector position.

Referring now to FIGS. 6-8, as the ball-joint selector 14 is manipulated about the center point 30 of the spherical cavity 26, the first and/or second pivots 34, 36 of the ball-joint selector 14 are manipulated within the first and/or second pivot cavities 90, 92, respectively. These first and second pivot cavities 90, 92 provide a clearance space 110 around each of the respective first and second pivots 34, 36 of the ball-joint selector 14. These clearance spaces 110 provide for rotation of the ball-joint selector 14 about the center point 30 of the spherical cavity 26 as well as, alternatively, about one of the first and second rotational axes 38, 40. In addition, as exemplified in FIG. 6, it is contemplated that the first and second pivots 34, 36 can engage the housing 20 to assist in maintaining the rotational position of the ball-joint selector 14 with respect to the longitudinal axis 72 of the stalk 70. Each of the first and second pivots 34, 36 is afforded movement through a single plane as well as about the respective first and second rotational axes 38, 40. This configuration maintains the ball-joint selector 14 in the rotationally fixed position with respect to the longitudinal axis 72 of the stalk 70. The first and second pivots 34, 36, and the planes that they operate through, are generally perpendicular with one another to produce the movements in the fore-aft direction 74 and the left-right direction 76. Additionally, the first pivot 34 can be generally perpendicular with the second pivot 36. Also, each of these components can be perpendicular to the detent sleeve 124 and the detent pin 42. Accordingly, in such an aspect of the device, the first pivot 34, the second pivot 36 and the detent sleeve 124 and detent pin 42 are in a perpendicular relationship with respect to each other.

Referring again to FIGS. 6-9, where only one of the first pivot 34 and the second pivot 36 are included in the ball-joint selector 14, only one of the first and second pivot cavities 90, 92 are included as part of the stability feature. In such an aspect of the device, such as where the first pivot 34 is excluded from the ball-joint selector 14, only the second pivot cavity 92 is included. When the ball-joint selector 14 is rotated about the first rotational axis 38, the second pivot 36 rotates within the clearance space 110 of the second pivot cavity 92. This isolated rotation of the ball-joint selector 14 about the first rotational axis 38 also prevents rotation of the ball-joint selector 14 about the second rotational axis 40 and about the longitudinal axis 72. Alternatively, when the ball-joint selector 14 is rotated about the second rotational axis 40, the second pivot 36 is held in a stable position within the second pivot cavity 92 through one or more detent features. In this manner, the ball-joint selector 14 is maintained in a position that allows for an isolated operation of the ball-joint selector 14 about the second rotational axis 40 and not about the first rotational axis 38 or about the longitudinal axis 72.

In certain aspects of the device, the first and/or second pivot cavities 90, 92 can each include a generally hourglass-shaped configuration to allow for the combined rotational movements of the first and second pivots 34, 36 when the ball-joint selector 14 is moved in a diagonal motion that includes a fore-aft component and a left-right component.

Typically, the ball-joint selector 14 is configured to be limited to movement in the fore-aft direction 74 and left-right direction 76, alternatively. In such an aspect of the device, the first and second pivot cavities 90, 92 have a width that is substantially similar to the first and second pivots 34, 36 of the ball-joint selector 14. Through this configuration, when the ball-joint selector 14 is operated about the first rotational axis 38, the second pivot 36 moves within a second pivot cavity 92. Conversely, when the ball-joint selector 14 is moved about the second rotational axis 40, the first pivot 34 moves within the first pivot cavity 90.

As exemplified in FIGS. 4-8, operation of the ball-joint selector 14 occurs about the center point 30 of the spherical cavity 26 and about one of the first and second rotational axes 38, 40. The ball-joint selector 14 is biased toward a consistent and repeatable home position 120, as described herein. It is also contemplated that the ball-joint selector 14 can be selectively and alternatively held in place through a series of selectable positions. In such an aspect of the device, such as a gear selector for a vehicle transmission, the ball-joint selector 14 can be held indefinitely within a series of stable positions. Accordingly, various communications between the ball-joint selector 14 and the housing 20 can be maintained in a consistent configuration for the communication of instructions from the user, through the ball-joint selector 14 and to the controller 50 for operating the mechanical assembly 12.

Referring again to FIGS. 3-8, the detent surface 44 defines the home position 120 within a base 130 of the detent surface 44. Additionally, a detent sleeve 124 extends from a portion of the spheroid member 32 to house a detent spring 132. The detent spring 132 is disposed within the detent sleeve 124 and biases the detent pin 42 towards the detent surface 44. In this manner, the detent spring 132 generates an outward biasing force 134 that, in turn, biases the detent pin 42 and the ball-joint selector 14 towards this home position 120, or one of the plurality of stable selector positions 46. The detent surface 44 can include any one of various surface geometries that form detent patterns. These detent patterns interact with the detent pin 42 and the detent spring 132 to temporarily or indefinitely retain the ball-joint selector 14 in a corresponding selector position 46.

In certain aspects of the device, the ball-joint selector 14 includes a single and continuous member. This single continuous member can be in the form of a single selector body 140 that includes the spheroid member 32, the detent sleeve 124, the first pivot 34, the second pivot 36, and, where applicable, the stalk 70. In such an aspect of the device, these components can be integrally formed as the selector body 140. Accordingly, the selector body 140 forms a unitary piece that operates within the continuous selector cavity 52.

The surface geometry of the detent surface 44 can include any one of various detent depressions 136 that are positioned eccentric to the home position 120 (or the series of selectable stable positions) to cooperate with the detent pin 42. These depressions 136 are used to define any one of various selector positions 46 of the ball-joint selector 14. It is also contemplated that the surface geometry of the detent surface 44 can include one or more detent rings that define concentric depressions 136 that extend around the home position 120 or around the stable selector positions 46. When the ball-joint selector 14 is manipulated in any direction about the center point 30 of the spherical cavity 26, the ball-joint selector 14 is moved into a certain portion of the detent ring or one of the detent depressions 136 of the detent surface 44. These depressions 136 temporarily retain the detent pin 42 to provide a haptic or tactile feedback to the user that a particular selected position has been achieved. The detent ring is configured to be sufficiently shallow to temporarily retain the detent pin 42, but also release the detent pin 42 after a short period of time so that the ball-joint selector 14 can be returned to the home position 120 or one of the stable selector positions 46. The return of the ball-joint selector 14 to the home position 120 or the stable selector positions 46 is achieved via interaction between the detent pin 42, the detent spring 132 and the detent surface 44 of the housing 20. As discussed herein, the detent pin 42 is biased in an outward direction. This biasing force 134 exerted by the detent spring 132 serves to bias the ball-joint selector 14 toward the home position 120 or the stable selector positions 46 with respect to the detent surface 44.

In certain aspects of the device, the detent surface 44 includes depressions 136 that extend around the home position 120 or around the stable selector positions 46. In addition, the depressions 136 or other surface geometries can extend outward from the home position 120 or the stable selector positions 46 to define an outward progression of depressions 136. Through this configuration, the ball-joint selector 14 can be moved into a first layer depression 136 that is proximate the home position 120 or the stable selector positions 46. The ball-joint selector 14 can be moved farther away from the home position 120 or the stable selector positions 46 to engage progressively outward depressions 136 that are along the same path of travel. Each of these depressions 136 or surface geometries of the detent surface 44 correspond to particular selector positions 46.

Referring again to FIGS. 6-8, the various guide surfaces 24 of the housing 20 cooperate to define the spherical cavity 26. These guide surfaces 24 define touch points where the spheroid member 32 of the ball-joint selector 14 slidably engages the guide surface 24 of the spherical cavity 26. These touch points are generally maintained during operation of the ball-joint selector 14 with respect to the spherical cavity 26 and the detent surface 44. This configuration maintains the ball-joint selector 14 in a consistent position that is in alignment with the center point 30 of the spherical cavity 26. Accordingly, each of the movements of the ball-joint selector 14 occur about this center point 30.

Referring again to FIGS. 1-8, the ball-joint selector 14 can include the ball-joint selector 14 that cooperates with the detent surface 44 to achieve any one of a variety of selector positions 46. It is also contemplated that the ball-joint selector 14 can include a separate rotational mechanism that can cooperate with the various selector positions 46 to provide an additional functionality of the user interface 48. By way of example, and not limitation, when a user moves the ball-joint selector 14 to a particular selector position 46, that selection can be used to activate a separate rotational interface that is attached to, or in communication with, the ball-joint selector 14. The rotational interface can be attached to the ball-joint selector 14 or can be a separate interface positioned within another portion of the user interface 48. Various touch-screen controls, buttons, dials, and other interfaces can also be incorporated within the selector assembly 10 having the ball-joint selector 14.

Referring again to FIGS. 1-8, the selector assembly 10 provides a compact lever-type selector that can be used with shift-by-wire mechanisms 16 in a vehicle setting. It is contemplated that the selector assembly 10 can be used for other dedicated mechanisms and components within a vehicle 18 or other mechanical settings as well. In addition, it is contemplated that the selector assembly 10 can be utilized in connection with the shift-by-wire mechanism 16. The selector assembly 10 can also include an interface that can be used to adjust or change parameters of a particular mechanical assembly 12 that the selector assembly 10 controls at that particular time. The selector assembly 10, in such a configuration, can be used as a singular user interface 48 that can control multiple systems within a vehicle setting or other mechanical setting.

Referring again to FIGS. 4-8, the ball-joint selector 14 allows the stalk 70 of the ball-joint selector 14 to tilt in fore-aft directions 74 as well as left-right directions 76. The detent spring 132 and the detent pin 42 cooperate with the detent surface 44 to provide haptic feedback and, in certain situations, auditory feedback as the detent pin 42 engages the various depressions 136 of the detent surface 44 that define the selector positions 46. The ball-joint selector 14 provides for a mechanism where the stalk 70 can be moved in multiple directions, while providing a haptic feedback in each direction that the ball-joint selector 14 is manipulated in. The ball-joint selector 14 includes the spheroid member 32 that is assembled into a cage that is defined by the guide surfaces 24 of the internal supports 22 for the housing 20. These guide surfaces 24, as discussed herein, define a spherical cavity 26 that contains the spheroid member 32 of the ball-joint selector 14. During operation of the ball-joint selector 14, the spheroid member 32 is contained within the spherical cavity 26 and in alignment with, or substantially in alignment with, the center point 30 of the spherical cavity 26. Using these components, a ball-joint selector 14 with multi-directional motion can be included within a vehicle setting through a compact interface with the minimal number of component parts.

In certain aspects of the device, the interface between the spheroid member 32 of the ball-joint selector 14 and the spherical cavity 26 of the housing 20 can include one or more friction-reducing materials or interfaces that can be used to provide ease of motion within the ball-joint selector 14 within the housing 20. These friction-reducing materials and mechanisms can include, but are not limited to, lubricants, bearings, smoothed surfaces, combinations thereof and other similar friction-reducing mechanisms.

Figure 3:
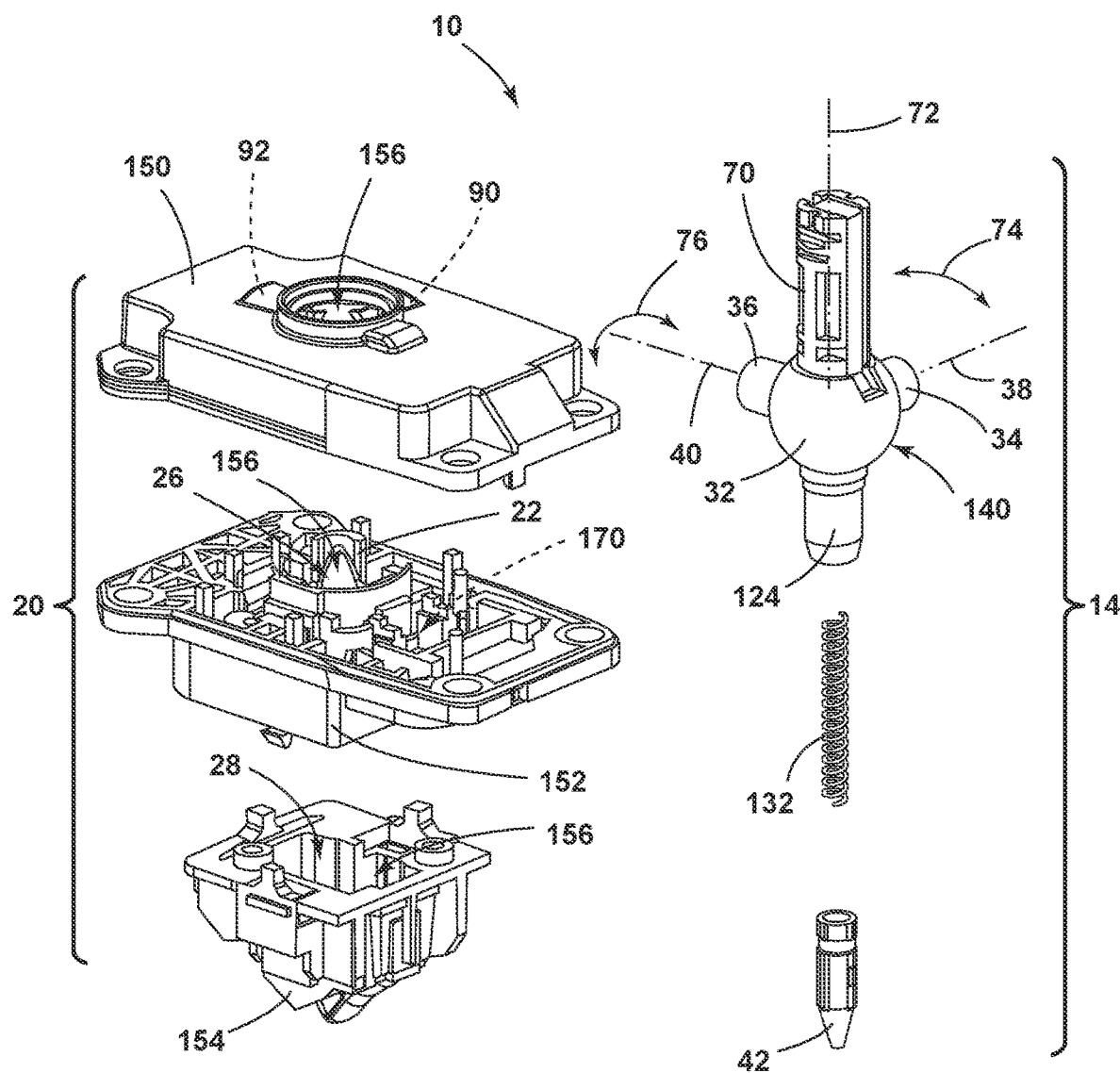
FIG. 3 is an exploded perspective view of the ball-joint selector of FIG. 2.
Figure 4:
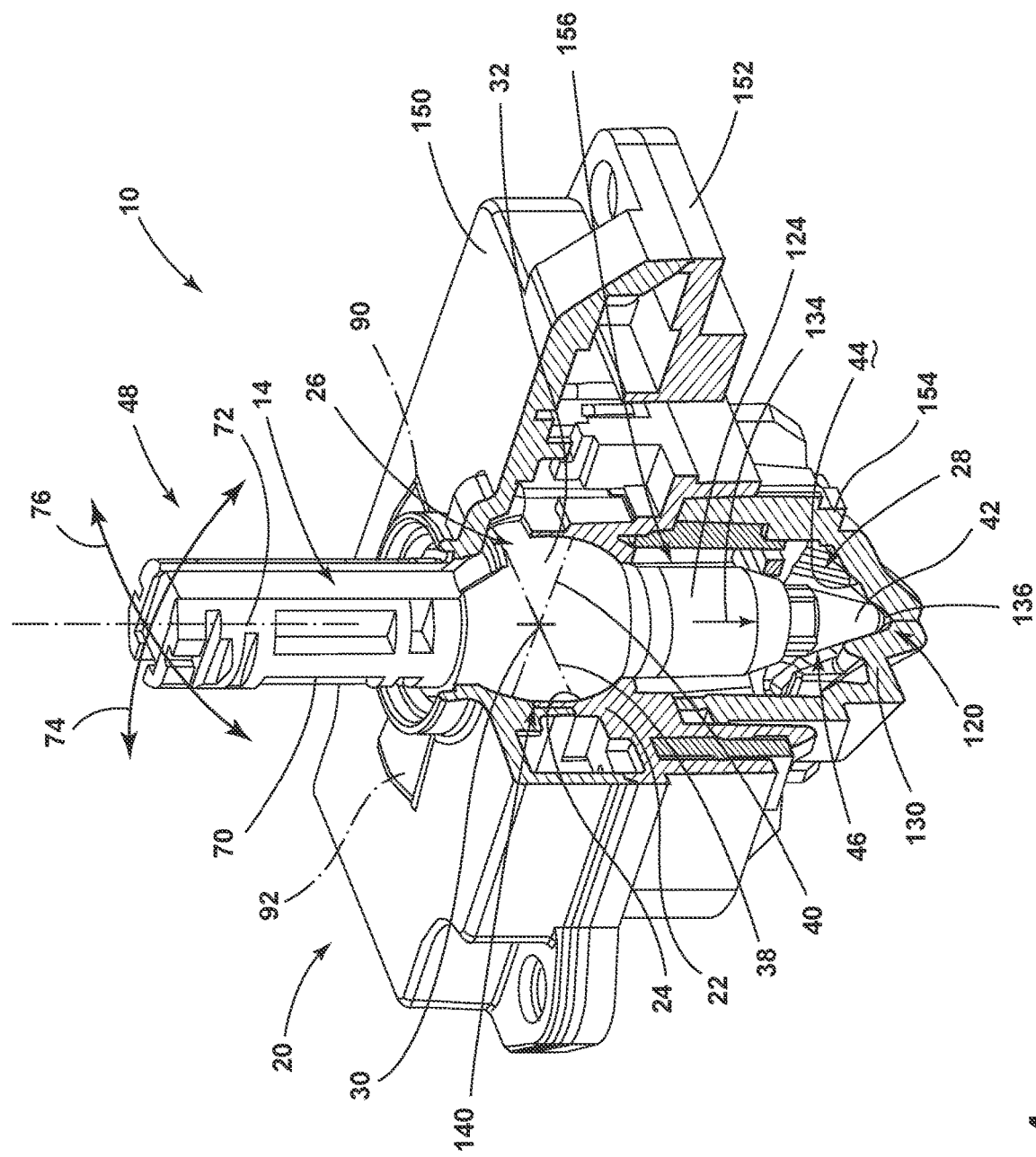
FIG. 4 is a cut-away perspective view of the ball-joint selector of FIG. 2 and showing placement of the spheroid member of the ball-joint selector within the spherical cavity of the housing.
Figure 5:
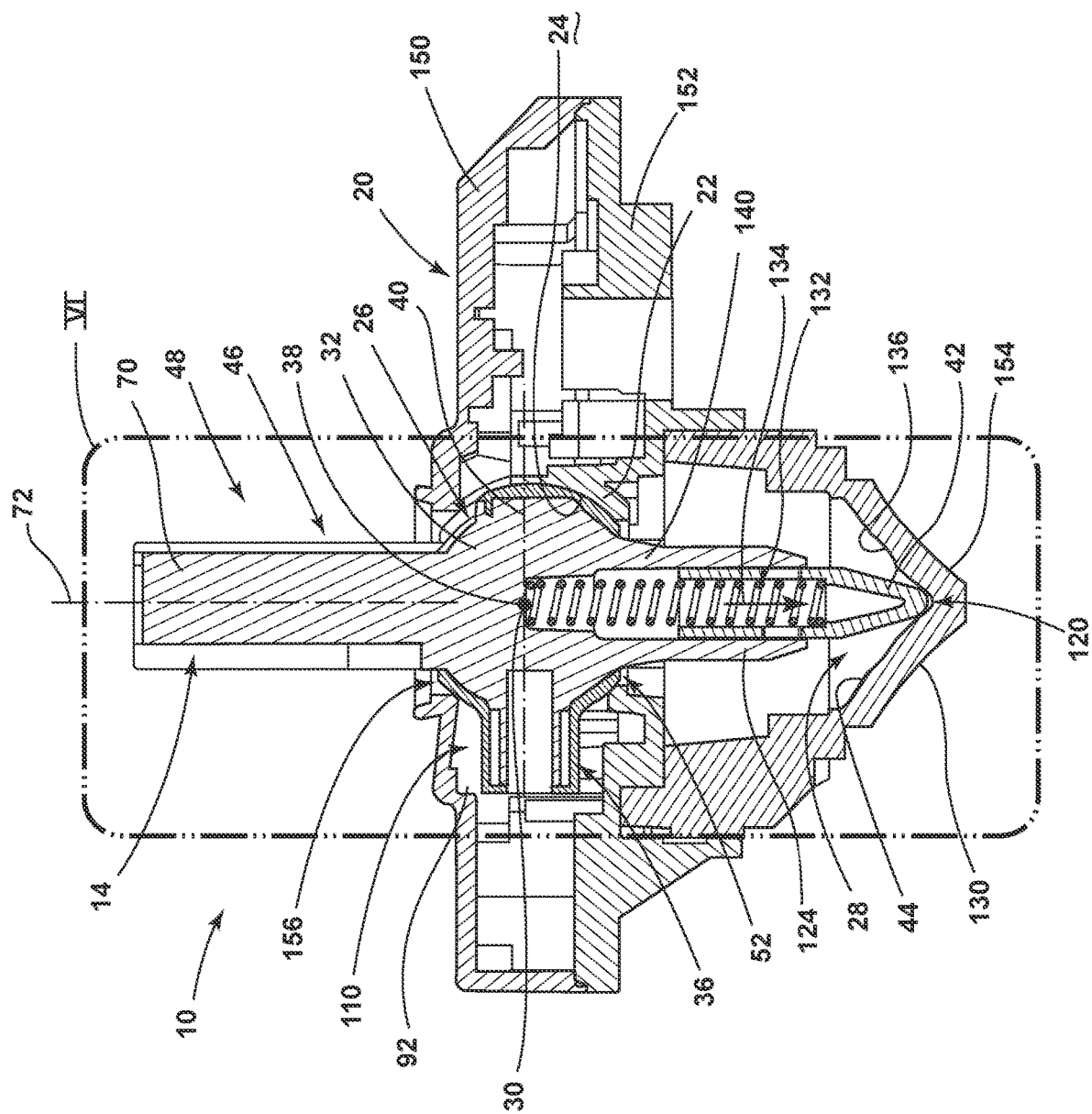
FIG. 5 is a cross-sectional view of the ball-joint selector of FIG. 2 take along line V-V.

As exemplified in FIG. 3, the first and second pivots 34, 36 of the ball-joint selector 14 can be used as a positive feedback mechanism when the selector assembly 10 is manufactured and assembled. The positioning of the detent surface 44 receives the detent pin 42 of the ball-joint selector 14. Also, the first pivot cavity 90 and second pivot cavity 92 receive the first and second pivots 34, 36, respectively. The interaction of the first and second pivots 34, 36 with the first and second pivot cavities 90, 92 defines a single rotational position of the ball-joint selector 14 within the housing 20. The same principle can be used where the ball-joint selector 14 includes only one of the first and second pivots 34, 36 and the corresponding one of the first and second pivot cavities 90, 92. This configuration creates a convenient and repeatable assembly mechanism that provides a clear positive feedback when the ball-joint selector 14 is properly positioned in the housing 20 during manufacture. When the housing 20 is assembled, an upper housing portion 150 can be attached with a lower housing portion 152. The detent surface 44 can be a separate detent portion 154 of the housing 20 that is attached to the lower housing portion 152 to complete the selector cavity 156. The selector cavity 156 includes one or more of the spherical cavity 26, the detent cavity 28 and the first and second pivot cavities 90, 92.

According to the various aspects of the device, the ball-joint selector 14 can be made of any one of various rigid materials. Such materials can include, but are not limited to, cast metal, rigid plastic, various polymers, forged metal, combinations thereof, and other similar materials. Where the ball-joint selector 14 is made of plastic, or at least partially made of plastic, the ball-joint selector 14 can be formed utilizing injection molding processes, insert molding processes, and other similar plastic-forming processes that can utilize both plastic and metal components.

According to various aspects of the device, the detent pin 42 can extend from a protrusion defined within a bottom portion of the spheroid member 32. The detent pin 42 can extend at various distances from the spheroid member 32, depending upon the configuration of the housing 20 for the selector assembly 10. It is contemplated that the detent pin 42 can extend from a portion of the spherical surface of the spheroid member 32, where the detent pin 42 extends from the spheroid member 32 to engage the detent surface 44. It is also contemplated that the detent pin 42 can be positioned within an integral extension of the ball-joint selector 14 that protrudes from the spheroid member 32 of the ball-joint selector 14.

According to various aspects of the device, the selector assembly 10 can include various positioning sensors 170 that can be used to monitor the positioning of the ball-joint selector 14 with respect to the detent surface 44 and the various selector positions 46 defined within the selector assembly 10. These various positioning sensors 170 can be placed in communication with the controller 50 for delivering instructions to the dedicated mechanical assembly 12, via the controller 50. As discussed herein, the selector assembly 10 provides a user interface 48 that can communicate certain intentions and instructions from the user, through the user interface 48 and to a particular mechanical assembly 12 within the vehicle 18 or other setting.

According to various aspects of the device, the selector assembly 10 can include a ball-joint selector 14 that includes multiple protrusions. As shown in FIGS. 1-8, first and second pivots 34, 36 extend from the spheroid member 32 of the ball-joint selector 14. It is contemplated that additional pivots can extend from the spheroid member 32 to further locate and position the ball-joint selector 14 within the housing 20. Typically, the spheroid member 32 will include the first and second pivots 34, 36. This configuration can provide for a locating mechanism that orients the selector assembly 10 in a particular rotational position with respect to the housing 20. Accordingly, the ball-joint selector 14 can be located within the housing 20 in a single rotational position that can align various positioning sensors 170 with corresponding receptors that communicate instructions to the respective controller or controllers 50.

According to various aspects of the device, the sensor that is included within the spheroid member 32 of the ball-joint selector 14 can be located at various angles with respect to the stalk 70 and the first and second pivots 34, 36. In certain instances, the sensor can be located along a lateral atmosphere of the spheroid member 32. In other instances, the sensor can be located along the longitudinal axis 72 of the stalk 70. Various positions of the sensor therebetween are also contemplated to achieve the desired feedback sensitivity when the ball-joint selector 14 is operated with respect to the spherical cavity 26 and the housing 20.

According to various aspects of the device, the selector assembly 10 disclosed herein provides a compact lever-type selector that can be placed into a small and confined space and also provides a sufficient level of haptic feedback and sensitivity for achieving the various selector positions 46 with respect to the detent surface 44. In addition, the compact configuration provides fewer components and a convenient assembly process that achieves repeatability and reliability in the manufacturing process. The configuration of the ball-joint selector 14 with the first and second pivots 34, 36 can be modified to achieve various shift patterns. In vehicular applications, the selector assembly 10 can be disposed within a console 180 of the vehicle 18, a dashboard, an armrest, or other similar location that may have a limited amount of available space within which to operate.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A selector assembly comprising:
   a housing having a spherical cavity and a detent cavity that form a continuous selector cavity; and
   a selector that slidably operates within the continuous selector cavity and about a center point of the spherical cavity, the selector comprising:
     a spheroid member that is contained within the spherical cavity and slidably engages a guide surface that defines the spherical cavity;
     a first pivot having a first rotational axis that extends through the center point of the spherical cavity;
     a second pivot having a second rotational axis that extends through the center point of the spherical cavity; and
     a detent pin that is biased toward a detent surface of the detent cavity and slidably engages the detent surface to define a plurality of selector positions of the selector.

2. The selector assembly of claim 1, wherein the selector and the housing define a user interface that is in communication with a controller, wherein operation of the selector within the spherical cavity and along the detent surface defines the plurality of selector positions.

3. The selector assembly of claim 2, wherein the plurality of selector positions are communicated to the controller for operating a dedicated mechanism that is coupled with the selector.

4. The selector assembly of claim 1, wherein the housing include internal supports that extend to the guide surface that partially defines the spherical cavity.

5. The selector assembly of claim 1, wherein the selector includes a stalk that extends from the spheroid member and protrudes from the housing to define a user interface.

6. The selector assembly of claim 5, wherein the detent pin extends from a detent sleeve, wherein the stalk, the spheroid member and the detent sleeve are a single continuous member that operates about the center point.

7. The selector assembly of claim 1, wherein the detent cavity extends outward from the spherical cavity.

8. The selector assembly of claim 1, wherein the first pivot, the second pivot and the detent pin are arranged in a perpendicular relationship with respect to each other.

9. The selector assembly of claim 3, wherein the dedicated mechanism is a shift-by-wire mechanism and the controller and the shift-by-wire mechanism are in communication with a vehicle transmission.

10. The selector assembly of claim 1, wherein the housing include a first pivot cavity and a second pivot cavity, wherein the first pivot of the selector extends into the first pivot cavity, and wherein the second pivot of the selector extends into the second pivot cavity.

11. The selector assembly of claim 1, wherein the selector is rotationally fixed with respect to a longitudinal axis that extends through a stalk of the selector.

12. A selector assembly comprising:
a housing having internal supports that extend to a guide surface that partially defines a spherical cavity, wherein the housing further includes a detent cavity that extends outward from the spherical cavity; and
a selector that slidably operates within the housing about a center point of the spherical cavity, the selector comprising:
a spheroid member that is contained within the spherical cavity and slidably engages the guide surface;
a first pivot having a first rotational axis that extends through the center point of the spherical cavity;
a second pivot having a second rotational axis that extends through the center point of the spherical cavity;
a stalk that extends from the spheroid member and protrudes from the housing, wherein the selector is rotationally fixed with respect to a longitudinal axis that extends through the stalk and the center point; and
a detent pin that is biased toward a detent surface of the detent cavity and slidably engages the detent surface to define a plurality of selector positions of the selector.

13. The selector assembly of claim 12, wherein the stalk of the selector and the housing define a user interface that is in communication with a controller, wherein operation of the selector within the spherical cavity and along the detent surface defines the plurality of selector positions that are communicated to the controller for operating a dedicated mechanism.

14. The selector assembly of claim 12, wherein the detent pin extends from a detent sleeve, wherein the stalk, the spheroid member and the detent sleeve are a single continuous member that operates about the center point.

15. The selector assembly of claim 12, wherein the detent cavity extends outward from the spherical cavity.

16. The selector assembly of claim 12, wherein the first pivot, the second pivot and the detent pin are arranged in a perpendicular relationship with respect to each other.

17. The selector assembly of claim 13, wherein the dedicated mechanism is a shift-by-wire mechanism and the controller and the shift-by-wire mechanism are in communication with a vehicle transmission.

18. The selector assembly of claim 12, wherein the housing includes a first pivot cavity and a second pivot cavity, wherein the first pivot of the selector extends into the first pivot cavity, and wherein the second pivot of the selector extends into the second pivot cavity.

19. A selector assembly for a vehicle, the selector assembly comprising:
a housing that is disposed within a console, the housing including a spherical cavity and a detent cavity that form a continuous selector cavity;
a selector that protrudes from the housing and slidably operates within the continuous selector cavity and about a center point of the spherical cavity, the selector comprising:
a selector body having a spheroid member slidably contained within the spherical cavity, a first pivot having a first rotational axis that extends through the center point of the spherical cavity, a second pivot having a second rotational axis that extends through the center point of the spherical cavity and a detent sleeve; and
a detent pin that extends from the detent sleeve and is biased toward a detent surface of the detent cavity and slidably engages the detent surface to define a plurality of selector positions of the selector, wherein the selector body is rotationally fixed with respect to a longitudinal axis that extends through a stalk of the selector.

20. The selector assembly of claim 19, wherein the selector and the housing define a user interface that is in communication with a controller, wherein operation of the selector within the spherical cavity and along the detent surface defines the plurality of selector positions that operates a shift-by-wire mechanism in communication with a vehicle transmission.

* * * * *